July 13, 1937. K. VON. HOLLEBEN ET AL 2,086,930
CASSETTE FOR PHOTOGRAPHIC FILMS
Filed Jan. 21, 1936   2 Sheets-Sheet 1
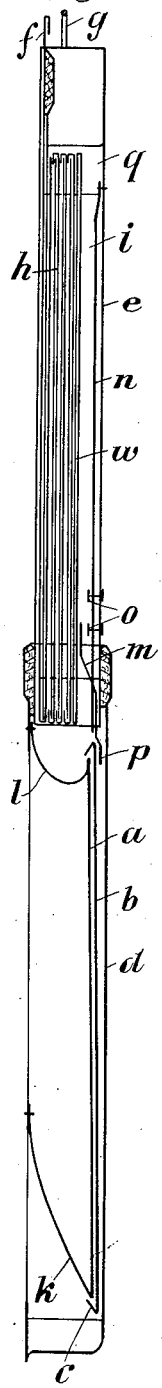
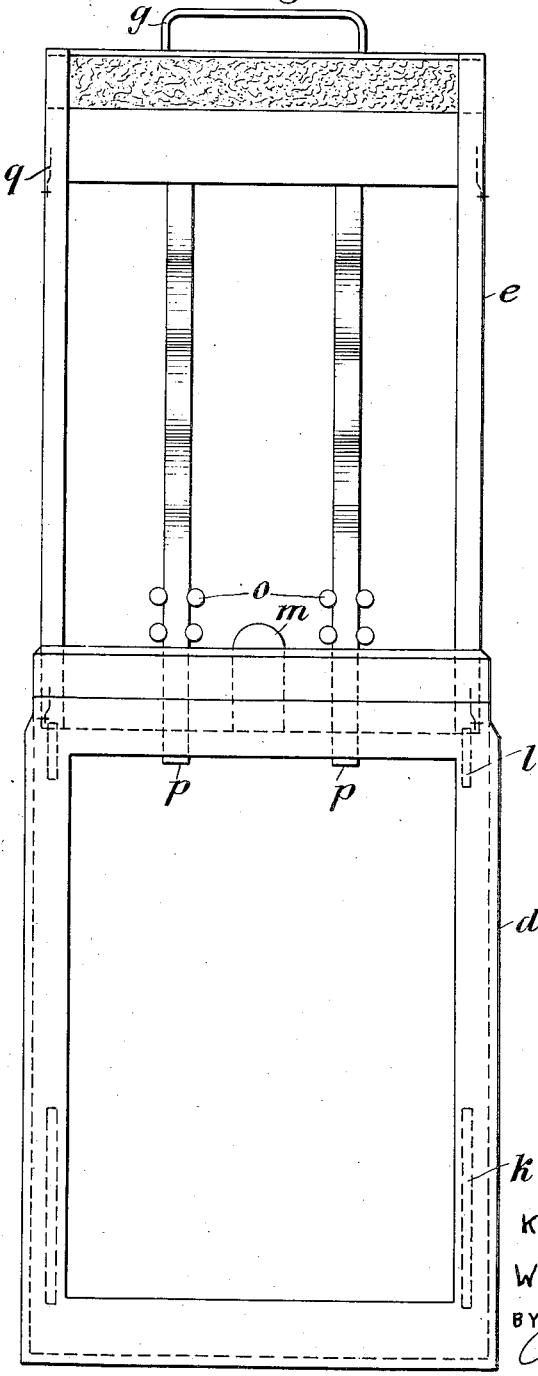
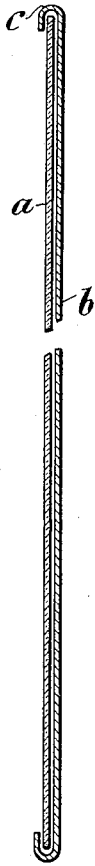
Inventors:
KURT VON HOLLEBEN
WOLF RODENACKER
BY Philip S. Hopkins
ATTORNEY

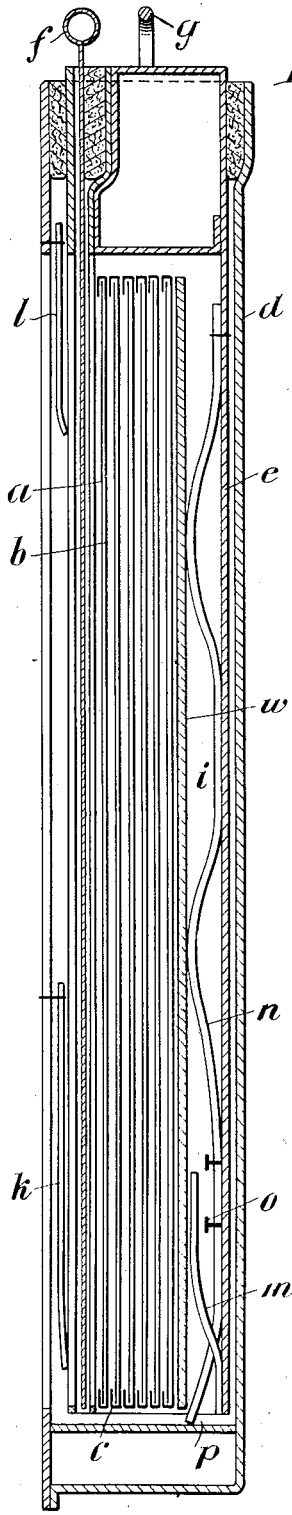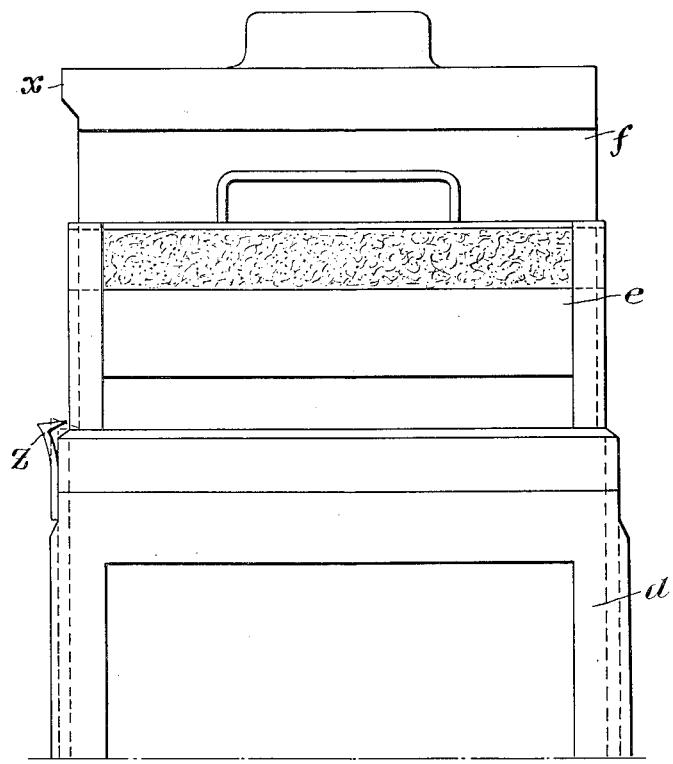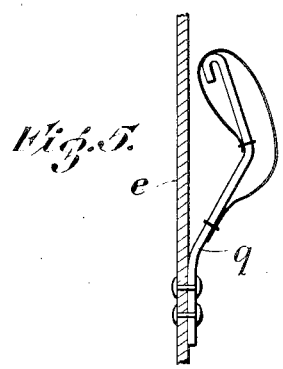

Patented July 13, 1937

2,086,930

UNITED STATES PATENT OFFICE 2,086,930

CASSETTE FOR PHOTOGRAPHIC FILMS

Kurt von Holleben, Leipzig, and Wolf Rodenacker, Wolfen Kreis Bitterfeld, Germany, assignors to Agfa Ansco Corporation, Binghamton, N. Y., a corporation of New York Application January 21, 1936, Serial No. 60,140
In Germany January 22, 1935

4 Claims. (Cl. 95—30)

This invention relates to a cassette for photographic films and more particularly to an exchange casette.

One of its objects is an improved exchange casette for photographic films. Further objects will be seen from the detailed specification following hereafter. Reference is made to the accompanying drawings in which:

Fig. 1 shows a single flat film viewed on its longer side and provided with a protective backing paper, Fig. 2 is a section on the middle plane of the extended cassette, Fig. 3 is a front elevation of the extended cassette, Fig. 4 is a vertical cross section through the closed cassette, Fig. 5 is a detail view of a spring fitted to the two side walls of the inner cassette for holding the films of the film-pack, and Fig. 6 is a modification of Fig. 3 in which a catch is provided for locking the inner cassette.

In exchange cassettes there have hitherto been used only the so-called pack films in which each film has a tab and after exposure is drawn by means of the tab around a bar into a receiver from which it can be removed in the dark room. These film packs are generally marketed in counted and numbered cartridges of metal, paper or the like and these cartridges are introduced into special cassettes for use. This invention relates to a new exchange cassette which enables the amateur and the professional photographer to use the so-called flat films, that is to say films having a comparatively thick support, which exist in large numbers on the market. It has already been proposed to use for plates exchange cassettes of construction similar to that now to be described, but for passing from plates to flat films there is required a number of parts supplied by this invention which are indispensable for the successful change of the films and it is only the combination comprising these parts that constitutes the present invention.

The invention will now be described with reference to the accompanying drawings.

It is essential that the flat films, such as are shown in Fig. 1, should be provided with a device whereby the individual film can be withdrawn. One method of providing for this necessity is a paper sheet $b$, of somewhat larger area than the film $a$, on which the film is laid and which has the double function of preventing penetration of light on to the next adjacent film during the exposure and affording by a fold on the narrow side of the film, indicated by $c$ in Fig. 1, a means for withdrawing the film when changing it. The protective paper may equally well be fixed to the film in some other manner, all that is necessary is that either by the protective paper or by the special cut in the film the withdrawing device $k$ can obtain a hold for the purpose of withdrawal.

The exchange cassette itself is shown in Figs. 2 to 4 and Fig. 6. $d$ is the outer casing of the cassette, $e$ the inner film casing, $f$ the cassette shutter which closes the inner casing light-tight. The inner casing has a handle $g$ by which it may be withdrawn from the outer casing. Advantageously the inner casing $e$ is positively connected by means of a catch with the outer casing so that withdrawal of the inner casing for the exchange of film is only possible when the shutter $f$ is closed, which for the release of said catch is provided with a projection $x$. This detail is shown in Fig. 6. In the inner casing the films $a$ are placed in the form of a pack $h$ (Fig. 2) in front of a stiff, movable partition $w$. The space $i$ behind the partition receives the exposed films.

The films are exchanged in the following manner:

The inner casing $e$ having been withdrawn from the outer casing $d$, as shown in Figs. 2 and 3, a spring $k$ fixed at each side of the frame of the casing $d$ engages behind the catch $c$ of the exposed film and thereby retains the latter in the outer casing. When the inner casing has attained the position shown in Fig. 2 a spring $l$ presses the upper end of the film $a$ into the position shown in Fig. 2. When the inner casing is again pressed into the outer casing a spring $m$, shown in Figs. 2 and 3, guides the film behind the separating wall of the two cassette chambers. A feature of the new cassette is two springs $n$ which in the extended cassette project beyond the lower end of the drawn-out part and during the exchange of film lie flat against the rear wall of the inner casing $e$ and are easily movable in the guides $o$. When the inner casing is pushed into the outer casing the projecting ends $p$ of the springs $n$, which during the exchange of film have the function of engaging the film, are pressed against the bottom of the inner casing so that they assume a wave form as indicated in Fig. 4, thus providing four symmetrically arranged swellings marked in Figs. 3 and 4 by crosses, which, in the position of rest, hold firmly pressed backwards both the exposed and the unexposed films. The function of these two springs is, therefore, characteristic and important because they allow the films to perform each movement in unstrained condition while in the closed casette all movable parts are held firmly by the pressure of these springs. In order to prevent the exposed films or the unexposed films from shifting during the recovery of the springs $n$, springs $q$ or their equivalent are fixed on the side walls as indicated in Figs. 2 and 3 and in detail in Fig. 5; these are covered with velvet or like soft material and hold the films at their edges during the recovery of the springs $n$. The form of the springs $k$ depends on the kind of catch provided on the film or on the protective paper $b$.

The cassette may be provided in any known manner with a counter operated every time the cassette is opened or closed. This is not shown in the drawings.

It is a particular advantage of the invention that during the exchange of film the latter suffers no damage by scratches and that the recovery of the springs $n$ during the opening of the cassette gives enough room for the film to pass from the forward into the rear part of the pack.

What we claim is:

1. An exchange cassette for photographic films which comprises a casing comprising a front wall, a back wall, two side walls and a bottom, a second casing fitting light-tight into said first casing comprising a front wall, a back wall, two side walls and a cover, a pack of flat films in said second casing, said second casing being slidably mounted in said first casing so as to be extensible, means mounted in said first casing for engaging the front film of said film-pack, means for pressing the upper end of a film retained in said first casing by said film engaging means in the direction of the back wall, a movable partition in said second casing for separating from the back wall flat films inserted in said casing, means provided in said second casing for guiding behind said movable partition films introduced in said first casing by said engaging means when moving said second casing from its extended position into said first casing, means provided on the back wall of said second casing which project beyond the said casing so that they curl when pushing said second casing from its extended position into said first casing thus pressing the flat films against said front wall.

2. An exchange cassette for photographic films which comprises a casing comprising a front wall, a back wall, two side walls and a bottom, a second casing fitting light-tight into said first casing comprising a front wall, a back wall, two side walls and a cover, a pack of flat films in said second casing, said second casing being slidably mounted in said first casing so as to be extensible, means mounted in said first casing for engaging the front film of said film pack, means for pressing the upper end of a film retained in said first casing by said film engaging means in the direction of the back wall, a movable partition in said second casing for separating from the back wall flat films inserted in said casing, means provided in said second casing for guiding behind said movable partition films introduced in said first casing by said engaging means when moving said second casing from its extended position into said first casing, springs provided on the back wall of said second casing which project beyond the said casing so that they curl when pushing said second casing from its extended position into said first casing thus pressing the flat films against said front wall.

3. An exchange cassette for photographic films which comprises a casing comprising a front wall, a back wall, two side walls and a bottom, a second casing fitting light-tight into said first casing comprising a front wall, a back wall, two side walls and a cover, a pack of flat films in said second casing, said second casing being slidably mounted in said first casing so as to be extensible, means mounted in said first casing for engaging the front film of said film pack, means for pressing the upper end of a film retained in said first casing by said film engaging means in the direction of the back wall, a movable partition in said second casing for separating from the back wall flat films inserted in said casing, means provided in said second casing for guiding behind said movable partition films introduced in said first casing by said engaging means when moving said second casing from its extended position into said first casing, springs provided on the back wall of said second casing which project beyond the said casing so that they curl when pushing said second casing from its extended position into said first casing thus pressing the flat films against said front wall, and means for guiding said springs.

4. An exchange cassette for photographic films which comprises a casing comprising a front wall, a back wall, two side walls and a bottom, a second casing fitting light-tight into said first casing comprising a front wall, a back wall, two side walls and a cover, a pack of flat films in said second casing, said second casing being slidably mounted in said first casing so as to be extensible, means mounted in said first casing for engaging the front film of said film pack, means for pressing the upper end of a film retained in said first casing by said film engaging means in the direction of the back wall, a movable partition in said second casing for separating from the back wall flat films inserted in said casing, means provided in said second casing for guiding behind said movable partition films introduced in said first casing by said engaging means when moving said second casing from its extended position into said first casing, springs provided on the back wall of said second casing which project beyond the said casing so that they curl when pushing said second casing from its extended position into said first casing thus pressing the flat films against said front wall, and pins mounted on both sides of said springs near the end of said casing for guiding said springs.

KURT v. HOLLEBEN.
WOLF RODENACKER.